(12) United States Patent
Park et al.

(10) Patent No.: US 12,390,949 B2
(45) Date of Patent: Aug. 19, 2025

(54) NOTCHING MOLD

(71) Applicant: LG Energy Solution, Ltd., Seoul (KR)

(72) Inventors: Sung Chul Park, Daejeon (KR); Sang Wook Kim, Daejeon (KR); Sin Young Park, Daejeon (KR); Dong Hyeuk Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 260 days.

(21) Appl. No.: 18/030,590

(22) PCT Filed: Oct. 25, 2021

(86) PCT No.: PCT/KR2021/015046
§ 371 (c)(1),
(2) Date: Apr. 6, 2023

(87) PCT Pub. No.: WO2022/092739
PCT Pub. Date: May 5, 2022

(65) Prior Publication Data
US 2024/0017437 A1  Jan. 18, 2024

(30) Foreign Application Priority Data
Oct. 29, 2020 (KR) .................... 10-2020-0142546

(51) Int. Cl.
B26F 1/12   (2006.01)
H01M 4/04   (2006.01)
(Continued)

(52) U.S. Cl.
CPC .............. B26F 1/12 (2013.01); H01M 4/04 (2013.01); H01M 50/531 (2021.01)

(58) Field of Classification Search
CPC ...... B26F 1/12; B26F 1/40; B26F 1/44; B26F 2001/449; B26F 2001/4427;
(Continued)

(56) References Cited

U.S. PATENT DOCUMENTS 2,127,131 A * 8/1938 Moeller .................. B26F 1/44
                                                    83/696
3,880,038 A * 4/1975 Mangos ................ B21D 37/10
                                                    83/685
(Continued)

FOREIGN PATENT DOCUMENTS

CN    201816936 U  *  5/2011  ............ H01M 4/139
CN    104094446 A  * 10/2014  ............. H01M 2/26
(Continued)

OTHER PUBLICATIONS

International Search Report for PCT/KR2021/015046 mailed Feb. 8, 2022. 3 pgs.
(Continued)

Primary Examiner — Ghassem Alie
(74) Attorney, Agent, or Firm — Lerner David LLP

(57) ABSTRACT

A notching mold for molding a non-coated portion of an electrode base material, wherein the non-coated portion, is formed on each of two ends of a coated portion, includes: a main mold having an upper mold and a lower mold, parallel to each other, and are slidable close to or away from each other. A first auxiliary mold having auxiliary upper and lower molds coupled to the upper and lower molds, respectively, is configured so that the non-coated portion on one end of the electrode base material is disposed at a processible position. A second auxiliary mold having auxiliary upper and lower molds coupled to the upper and lower molds, respectively, is configured so that, when the electrode base material is input into the main mold, the non-coated portion on the other end of the electrode base material is disposed at a processible position.

11 Claims, 4 Drawing Sheets

(51) Int. Cl.
*H01M 4/40* (2006.01)
*H01M 50/531* (2021.01)

(58) Field of Classification Search
CPC ........ B26F 2210/00; B26F 2001/4418; H01M 50/531; H01M 4/04; H01M 10/0404; H01M 4/139; B26D 7/025; B26D 7/015; B21D 43/28; B21D 28/02; Y02E 60/10
USPC .......................................................... 83/692
See application file for complete search history.

(56) References Cited

U.S. PATENT DOCUMENTS

| | | |
|---|---|---|
| 2020/0206965 A1 | 7/2020 | Kwak et al. |
| 2021/0086388 A1 | 3/2021 | Lee et al. |
| 2022/0203572 A1 | 6/2022 | Kwak et al. |

FOREIGN PATENT DOCUMENTS

| | | | |
|---|---|---|---|
| EP | 3632636 A1 | 4/2020 | |
| KR | 20030086070 A | 11/2003 | |
| KR | 100908573 B1 | 7/2009 | |
| KR | 20160077641 A | 7/2016 | |
| KR | 101691937 B1 | 1/2017 | |
| KR | 20170027993 A | 3/2017 | |
| KR | 101737790 B1 | 5/2017 | |
| KR | 20180014560 A * | 2/2018 | ............ H01M 4/139 |
| KR | 20190096115 A | 8/2019 | |
| KR | 20190106077 A | 9/2019 | |
| KR | 20190136551 A | 12/2019 | |
| KR | 102102717 B1 | 6/2020 | |
| KR | 20200071915 A | 6/2020 | |
| KR | 20200099433 A | 8/2020 | |

OTHER PUBLICATIONS

Anonymous "mould I mold, n.3 meanings, etymology and more : Oxford English Dictionary", Mar. 11, 2024 (Mar. 11, 2024), pp. 1-18, xp093140125, Retrieved from the Internet: URL: https://www.oed.com/dictionary/mould_n3?tab=meaning_and_use#35712937 [retrieved on Mar. 12, 2024].
Extended European Search Report including Written Opinion for Application No. 21886733.1 dated Mar. 21, 2024, pp. 1-11.

* cited by examiner

NOTCHING MOLD

CROSS-REFERENCE TO RELATED APPLICATIONS

The present application is a national phase entry under 35 U.S.C. § 371 of the International Application No. PCT/KR2021/015046 filed on Oct. 25, 2021, which claims priority from Korean Patent Application No. 10-2020-0142546, filed on Oct. 29, 2020, the disclosures of which are incorporated herein by reference in their entireties.

FIELD OF THE INVENTION

The present invention relates to a notching mold, which molds an electrode tab on an electrode base material, in which an active material is applied to a surface of a collector, wherein a non-coated portion, on which the active material is not applied, is formed on each of one end and the other end of a coated portion, on which the active material is applied, or which processes the base material as an individual electrode, on which an electrode tab is molded, and more particularly, to a notching mold that is capable of processing a plurality of individual electrodes in one stroke and capable of more easily notching electrodes having various sizes because of performing individual notching of a first auxiliary mold and a second auxiliary mold, which are mounted in a main mold.

BACKGROUND OF THE INVENTION

In general, secondary batteries refer to chargeable and dischargeable batteries, unlike primary batteries that are not chargeable. The secondary batteries are being widely used in the high-tech electronic fields such as mobile phones, notebook computers, and camcorders.

Such a secondary battery is classified into a can type secondary battery in which an electrode assembly is built in a metal can and a pouch type secondary battery in which an electrode assembly is built in a pouch. The pouch type secondary battery comprises an electrode assembly, an electrolyte, and a pouch accommodating the electrode assembly and the electrolyte. Also, the electrode assembly has a structure in which a plurality of electrodes and a plurality of separators are alternately stacked.

Referring to FIG. 1A, which illustrates processing of individual electrodes in an electrode base material 1, a positive electrode base material or a negative electrode base material, which is processed using a notching mold, is provided in a state in which a positive electrode active material or a negative electrode active material is applied in a longitudinal direction of a positive electrode collector or a negative electrode collector except for a portion of each of both ends thereof.

In addition, when the electrode base material is input between notching molds as illustrated in FIG. 1B that illustrates an upper mold and a lower mold of a notching mold according to the related art, a non-coated portion 1a formed on one end or each of both ends of a coated portion 1b of an electrode base material 1 is processed as an electrode tab 2a by pressing of an embossed part 3a and an engraved part 4a, which are engaged with each other when an upper mold 3 and a lower mold 4 are closed.

Here, cutting into individual electrodes 2 may also be performed together with the processing of the non-coated portion 1a by the notching mold or a separate cutting device.

That is, it is processed into the individual electrodes 2 having shapes as illustrated in following FIG. 1a.

That is, the notching performed in the notching mold means 'cut off', for example, means processing of cutting an unnecessary portion of the non-coated portion 1a to form the electrode tab 2a, processing of forming the electrode tab 2a and cutting the base material 1 by a predetermined length to form the individual electrodes 2, or processing of cutting the entire non-coated portion 1a at one side. The coated portion 1b of the electrode base material 1 is cut into the coated portion 2b of each of the individual electrodes 2 having a predetermined size.

In the notching mold according to the related art, when an electrode base material 1 having a different size is input, there is a problem that both the upper mold 3 and the lower mold 4 are exchanged, or a processable electrode base material 1 is limited in size. In addition, since it is difficult to individually adjust a plurality of embossed parts 3a and engraved parts 4a in order to process a plurality of electrode tabs 2a in one stroke by forming the plurality of embossed parts 3a and engraved parts 4a, and there is a problem that a processing deviation increases, there is difficult to be applied in practice.

BRIEF SUMMARY OF THE INVENTION

Therefore, in order to solve the problems of the structure according to the related art, a main object of the present invention is to provide a notching mold that is capable of individually processing both electrode tabs and adjusting individual setting during the processing.

A notching mold, which molds a non-coated portion when an electrode base material, in which an active material is applied to a surface of a collector, is input, wherein the non-coated portion, on which the active material is not applied, is formed on each of one end and the other end of a coated portion, on which the active material is applied, according to the present invention for achieving the above object comprises: a main mold comprising an upper mold and a lower mold, which are parallel to each other, wherein the upper mold and the lower mold are slidable close to or away from each other; a first auxiliary mold configured so that, when the electrode base material is input into the main mold, the non-coated portion on one end of the electrode base material is disposed at a processible position, the first auxiliary mold comprising a first auxiliary upper mold coupled to the upper mold and a first auxiliary lower mold coupled to the lower mold; and a second auxiliary mold configured so that, when the electrode base material is input into the main mold, the non-coated portion on the other end of the electrode base material is disposed at a processible position, the second auxiliary mold comprising a second auxiliary upper mold coupled to the upper mold and a second auxiliary lower mold coupled to the lower mold.

When the upper mold and the lower mold of the main mold are slid, the sliding of the first auxiliary upper mold and the first auxiliary lower mold of the first auxiliary mold and the sliding of the second auxiliary upper mold and the second auxiliary lower mold of the second auxiliary mold may be performed at the same time to individually and respectively notch the non-coated portions of the first auxiliary mold and the second auxiliary mold at the same time (here, the notching process comprises the following meanings. That is, the notching process comprises 'forming of an electrode tab', 'forming of an electrode tab and cutting the electrode tab into individual electrodes' or 'cutting of the non-coated portion').

The first auxiliary upper mold and the second auxiliary upper mold may be coupled to be detachable and adjustable in position in the upper mold, and the first auxiliary lower mold and the second auxiliary upper mold may be coupled to be detachable and adjustable in position in the lower mold.

When the electrode base material is input into the main mold, the first auxiliary mold and the second auxiliary mold may perform the processing so that the plurality of electrode tabs are molded in one stroke.

A stripper that presses and fixes the coated portion when the electrode base material is input may be disposed between the first auxiliary mold and the second auxiliary mold.

The stripper may comprise an upper stripper coupled to the upper mold and a lower stripper coupled to the lower mold, wherein, when the non-coated portions are molded using the first auxiliary mold and the second auxiliary mold, a predetermined pressure may be applied to the coated portion between the upper stripper and the lower stripper to fix movement of the coated portion.

The upper stripper may comprise a main upper stripper disposed at a center between the first auxiliary upper mold and the second auxiliary upper mold and an auxiliary upper stripper disposed at one side of the main upper stripper with a gap therebetween, and the lower stripper may comprise a main lower stripper disposed at a center between the first auxiliary lower mold and the second auxiliary lower mold and an auxiliary lower stripper disposed at one side of the main lower stripper with a gap therebetween.

The auxiliary upper stripper may be disposed at each of both the sides of the main upper stripper with a gap therebetween, and the auxiliary lower stripper may be disposed at each of both the sides of the main lower stripper with a gap therebetween.

Each of the auxiliary upper stripper and the auxiliary lower stripper may be detachable. The auxiliary upper stripper may be detachably coupled to the first auxiliary upper mold of the first auxiliary mold or the second auxiliary upper mold of the second auxiliary mold, and the auxiliary lower stripper may be detachably coupled to the first auxiliary lower mold of the first auxiliary mold or the second auxiliary lower mold of the second auxiliary mold.

The gap between the main upper stripper and the auxiliary upper stripper and the gap between the main lower stripper and the auxiliary lower stripper may be dislocated along a vertical direction.

In the present invention having the above configuration, since the first and second auxiliary molds individually notch the non-coated portions disposed at both the ends of the electrode base material, both the non-coated portions may be more easily molded, and the larger and various types of electrode base materials may be notched.

Since the first and second auxiliary molds individually and simultaneously notch the non-coated portions, respectively, the design flexibility of processing each of the electrode tabs at both the sides may increase, and the processing position and precision may be adjusted more easily.

In the notching mold according to the present invention, since the stripper is provided, the movement of the coated portion may be fixed when the notching is performed.

Since the stripper is divided into the main stripper (the main upper stripper and the main lower stripper) and the auxiliary stripper (the auxiliary upper stripper and the auxiliary lower stripper), the coated portion may be more stably supported by replacing only the auxiliary stripper according to the thermal expansion coefficient of the electrode base material due to the temperature.

Furthermore, the gap between the main upper stripper and the auxiliary upper stripper and the gap between the main lower stripper and the auxiliary lower stripper may be dislocated along the vertical direction to prevent pressing, the marks, or the jamming from occurring on the electrode base material. The auxiliary stripper may be detachably mounted on the first auxiliary mold and the second auxiliary mold and thus may be easily exchanged together when replacing the first auxiliary mold and the second auxiliary mold.

Figure 1A:
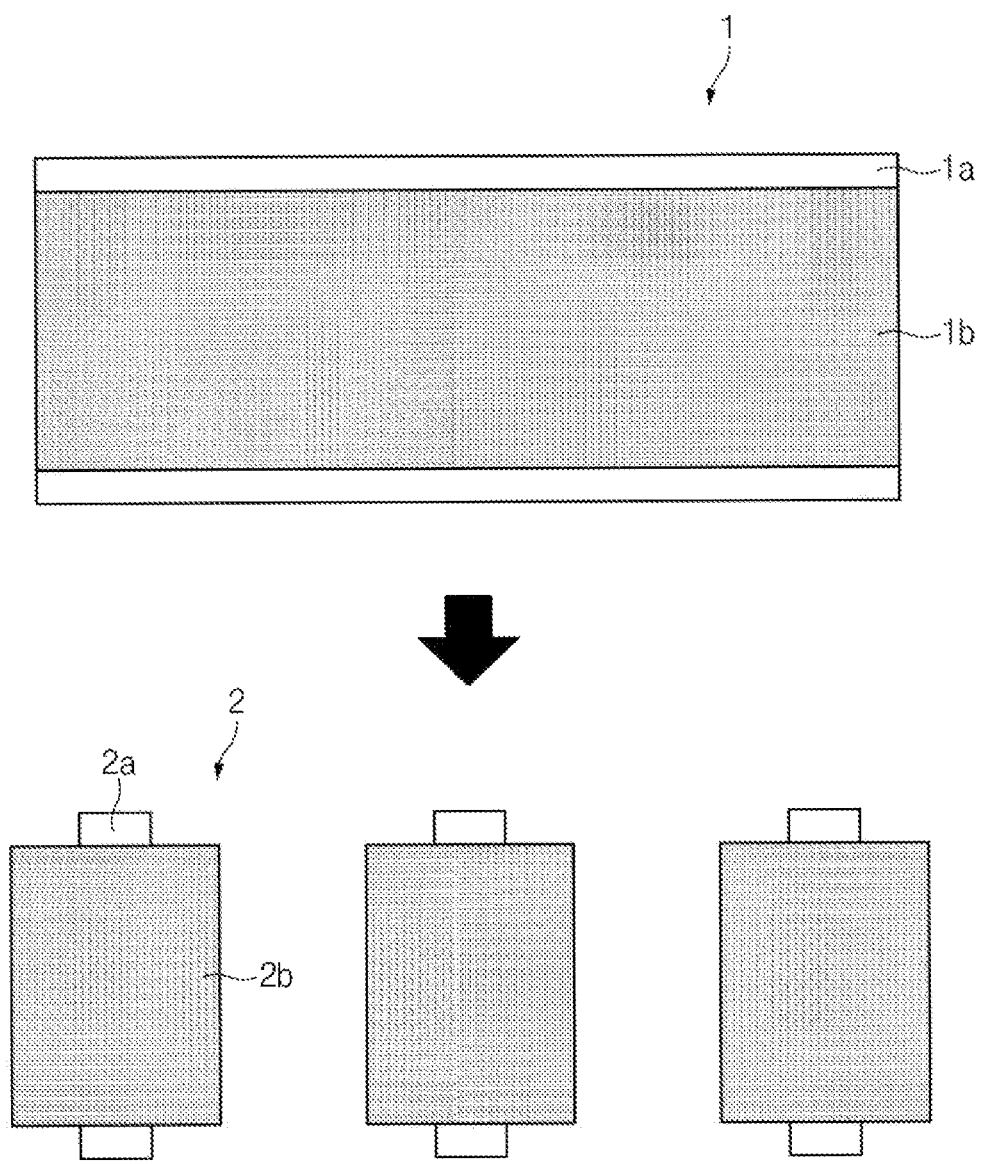
FIG. 1A is a view illustrating a state of being notched into individual electrodes in an electrode base material.

Hereinafter, preferred embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein.

In order to clearly describe the present invention, parts irrelevant to the description are omitted, and the same reference numerals are assigned to the same or similar components throughout the specification.

Also, terms or words used in this specification and claims should not be restrictively interpreted as ordinary meanings or dictionary-based meanings, but should be interpreted as meanings and concepts conforming to the scope of the present invention on the basis of the principle that an inventor can properly define the concept of a term to describe and explain his or her invention in the best ways.

The present invention relates to a notching mold that notches a non-coated portion (molds an electrode tab on the non-coated portion) when an electrode base material 1 is input so that the base material 1, in which an active material is applied to a surface of a collector, wherein a non-coated portion, on which the active material is not applied, is formed on each of one end and the other end of a coated portion 1b, on which the active material is applied, is notched into individual electrodes 2, on which an electrode tab 2a is formed on each of both ends or one end of the non-coated portion 2b. Hereinafter, embodiments according to the present invention will be described with reference to the accompanying drawings.

FIRST EMBODIMENT

Figure 2:
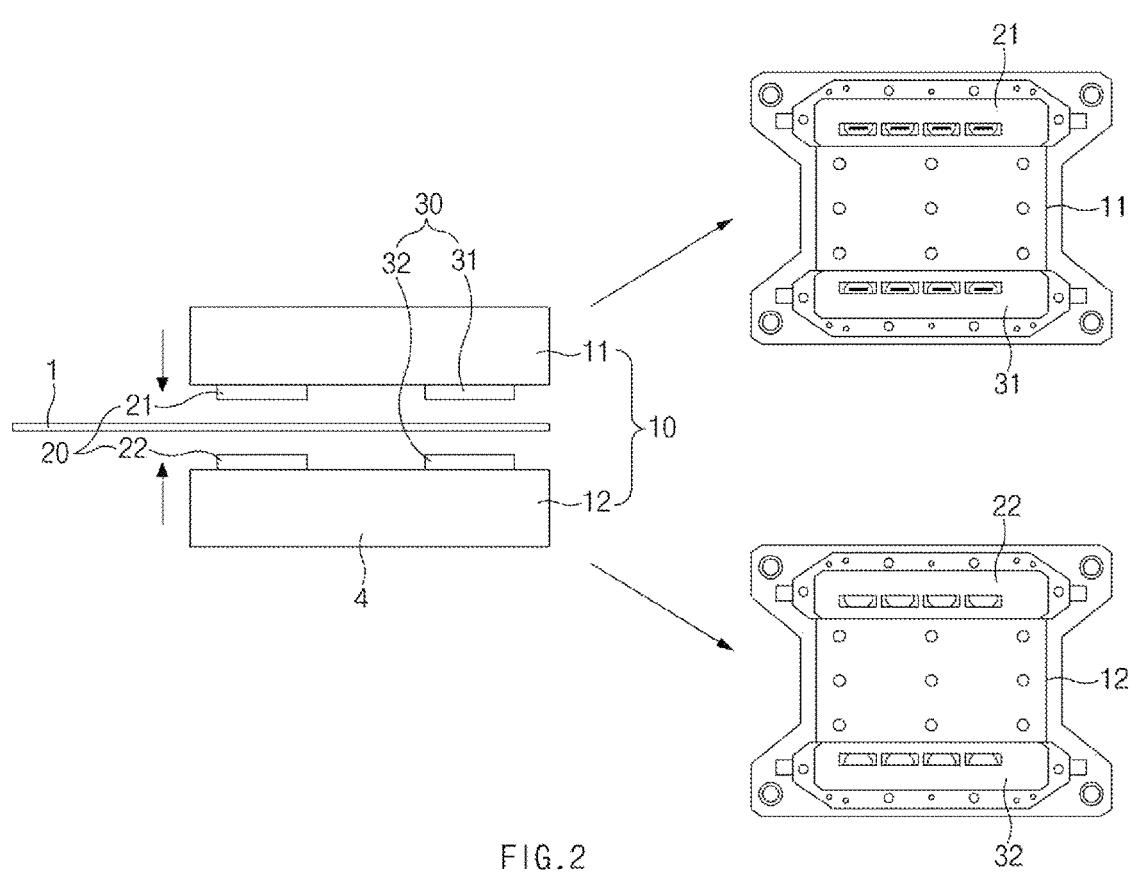
FIG. 2 is a plan view of an upper mold and a lower mold of a notching mold according to a first embodiment of the present invention.
Figure 3:
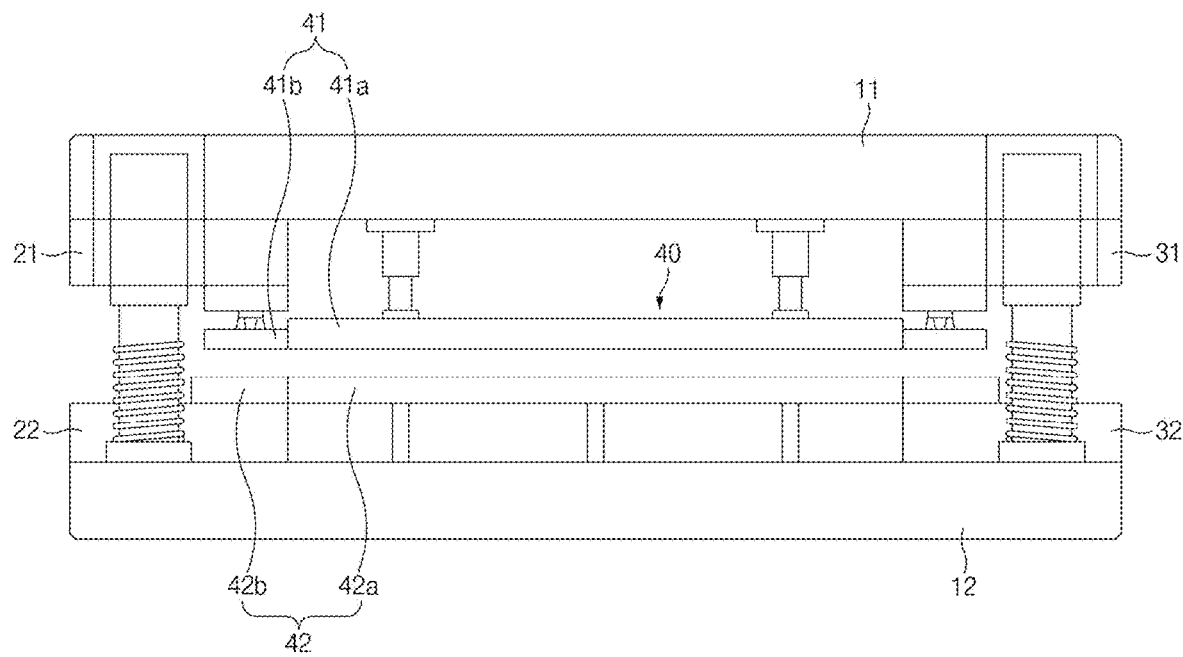
FIG. 3 is a side view of the upper mold and the lower mold of the notching mold according to the first embodiment of the present invention.
Figure 4:
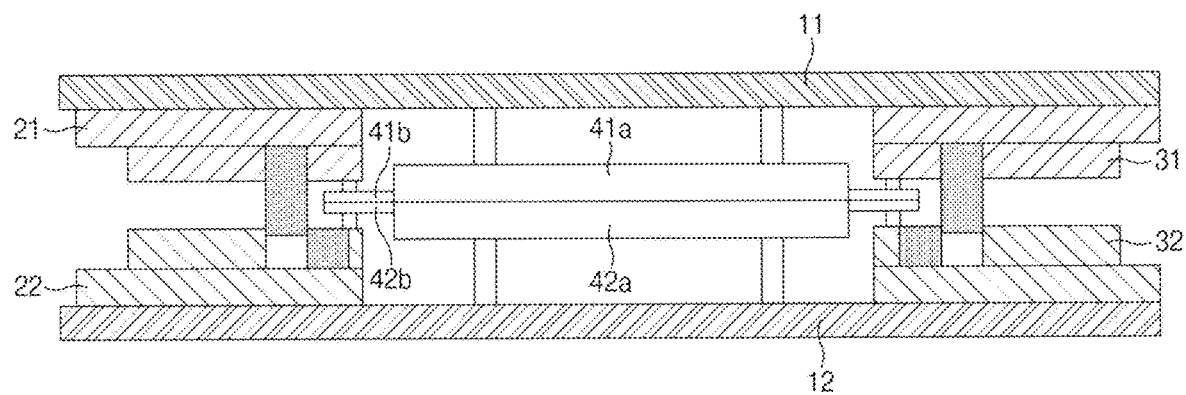
FIG. 4 is a view illustrating a state in which the upper mold and the lower mold are closed in FIG. 3.

FIG. 2 is a plan view of an upper mold and a lower mold of a notching mold according to a first embodiment of the present invention, FIG. 3 is a side view of the upper mold and the lower mold of the notching mold according to the first embodiment of the present invention, and FIG. 4 is a view illustrating a state in which the upper mold and the lower mold are closed in FIG. 3.

Referring to the accompanying drawings, a notching mold provided in this embodiment comprises a main mold 10 and first and second auxiliary molds 20 and 30, which are additionally coupled to one side and the other side of the main mold 10, respectively.

As illustrated in FIG. 2, the main mold 10 comprises an upper mold 11 and a lower mold 12, which are parallel to each other. The upper mold 11 and the lower mold 12 are configured to be slidable close to or away from each other. That is, in a state in which the lower mold 12 is fixed, the upper mold 11 descends, or in a state in which the upper mold 11 is fixed, the lower mold 12 ascends. Alternatively, the upper mold 11 descends, and the lower mold 12 ascends. Here, each of surfaces facing each other thereof is formed as a flat surface.

In addition, the first auxiliary mold 20 is mounted at one side of the main mold 10, and the second auxiliary mold 30 is mounted at the other side of the main mold 10.

When the electrode base material 1 is input into the main mold 10, the first auxiliary mold 20 is disposed at a position at which the non-coated portion 1a is processed at one end of the electrode base material 1. The first auxiliary mold comprises a first auxiliary upper mold 21 and a first auxiliary lower mold 22, and also, the first auxiliary upper mold 21 is coupled to the upper mold 11, and the first auxiliary lower mold 22 is coupled to the lower mold 12.

When the electrode base material 1 is input into the main mold 10, the second auxiliary mold 30 is disposed at a position at which the non-coated portion 1a is processed at the other end of the electrode base material 1. The second auxiliary mold comprises a second auxiliary upper mold 31 and a second auxiliary lower mold 32, and also, the second auxiliary upper mold 31 is coupled to the upper mold 11 at an opposite side of the first auxiliary upper mold 21, and the second auxiliary lower mold 32 is coupled to the lower mold 12 at an opposite side of the first auxiliary lower mold 22.

Thus, when the upper mold 11 and the lower mold 12 of the main mold 10 are slid, the sliding of the first auxiliary upper mold 21 and the first auxiliary lower mold 22 of the first auxiliary mold 20 and the sliding of the second auxiliary upper mold 31 and the second auxiliary lower mold 32 of the second auxiliary mold 30 are performed at the same time.

Thus, the first auxiliary mold 20 and the second auxiliary mold 30 may individually and simultaneously notch the non-coated portions 1a of the electrode base material 1. That is, the notching process performed here means all three processing, for example, 'processing of molding the electrode tab', 'processing of forming the electrode tab and then cutting the electrode tab into individual electrodes, or 'processing of cutting the non-coated portion from the coated portion'.

The first auxiliary upper mold 21 and the second auxiliary upper mold 31 provided in this embodiment are coupled to be detachable and adjustable in position in the upper mold 11, and the first auxiliary lower mold 21 and the second auxiliary upper mold 21 are coupled to be detachable and adjustable in position in the lower mold 12.

Thus, when it is necessary to adjust a size or position of the electrode tab according to a size of the electrode base material 1 on which the notching is performed, the notching may be performed by adjusting or replacing only any one of the first auxiliary mold 20 and/or the second auxiliary mold 30 without replacing the entire main mold 10.

Figure 1B:
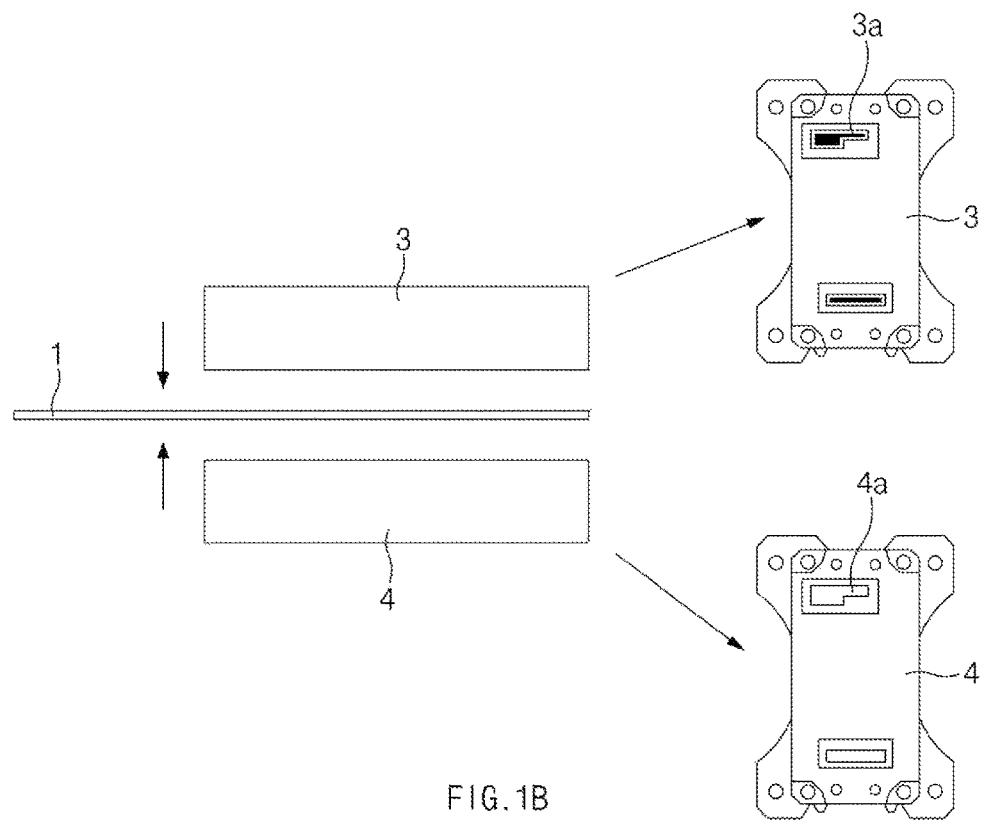
FIG. 1B is a view illustrating shapes of an upper mold and a lower mold of a notching mold according to a related art.

In addition, in the mold according to the related art, as illustrated in FIG. 1b, only one embossed part 3a and only one engraved part 4a are formed on the upper mold 3 and the lower mold 4, respectively. However, in the mold provided in the present invention, since the first auxiliary mold 20 and the second auxiliary mold 30 are disposed to be separated from each other, as illustrated in FIG. 2, the first and second auxiliary upper molds 21 and 31 and the first and second auxiliary lower molds 22 and 32 may be disposed in pairs, and thus, a plurality of embossed parts may be formed on the first auxiliary upper mold 21 and the second auxiliary upper mold 31, and a plurality of engraved parts may be formed in the first auxiliary lower mold 22 and the second auxiliary lower mold 32.

Thus, in the notching mold provided in this embodiment, when the electrode base material 1 is input into the main mold 10, the first auxiliary mold 20 and the second auxiliary mold 30 may perform the processing so that the plurality of electrode tabs are molded in one stroke at the same time.

SECOND EMBODIMENT

Furthermore, the notching mold according to the present invention may comprise a stripper 40. That is, as more clearly illustrated in FIGS. 3 and 4, in the notching mold provided in this embodiment, when the electrode base material 1 is input between the first auxiliary mold 20 and the second auxiliary mold 30, the stripper 40 that presses and fixes the coated portion 1b disposed between both the non-coated portions 1a may be disposed.

The stripper 40 comprises an upper stripper 41 coupled to the upper mold 11 and a lower stripper 42 coupled to the lower mold 12. When the non-coated portions are molded using the first auxiliary mold 20 and the second auxiliary mold 30, a predetermined pressure is applied to the coated portion 1b between the upper stripper 41 and the lower stripper 42 to fix movement of the coated portion 1b.

The upper stripper 41 comprises a main upper stripper 41a disposed at a center between the first auxiliary upper mold 21 and the second auxiliary upper mold 31 and an auxiliary upper stripper 41b disposed at one side of the main upper stripper 41 with a gap therebetween.

Also, the lower stripper 42 comprises a main lower stripper 42a disposed at a center between the first auxiliary lower mold 22 and the second auxiliary lower mold 32 and an auxiliary lower stripper 42b disposed at one side of the main lower stripper 42a with a gap therebetween.

Here, the auxiliary upper stripper 41b is disposed at each of both the sides of the main upper stripper 42a with a gap between the auxiliary upper stripper 41b and the main upper stripper 42a, and the auxiliary lower stripper 42b is disposed at each of both the sides of the main lower stripper 42a with a gap between the auxiliary lower stripper 42b and the main lower stripper 42a.

The auxiliary upper stripper 41b and the auxiliary lower stripper 42b are detachable. That is, the auxiliary upper stripper 41b is detachably coupled to the first auxiliary upper mold 21 of the first auxiliary mold 20 or the second auxiliary upper mold 31 of the second auxiliary mold 30, and the auxiliary lower stripper 42b is detachably coupled to the first auxiliary lower mold 21 of the first auxiliary mold 20 or the second auxiliary lower mold 32 of the second auxiliary mold 30.

Figure 5:
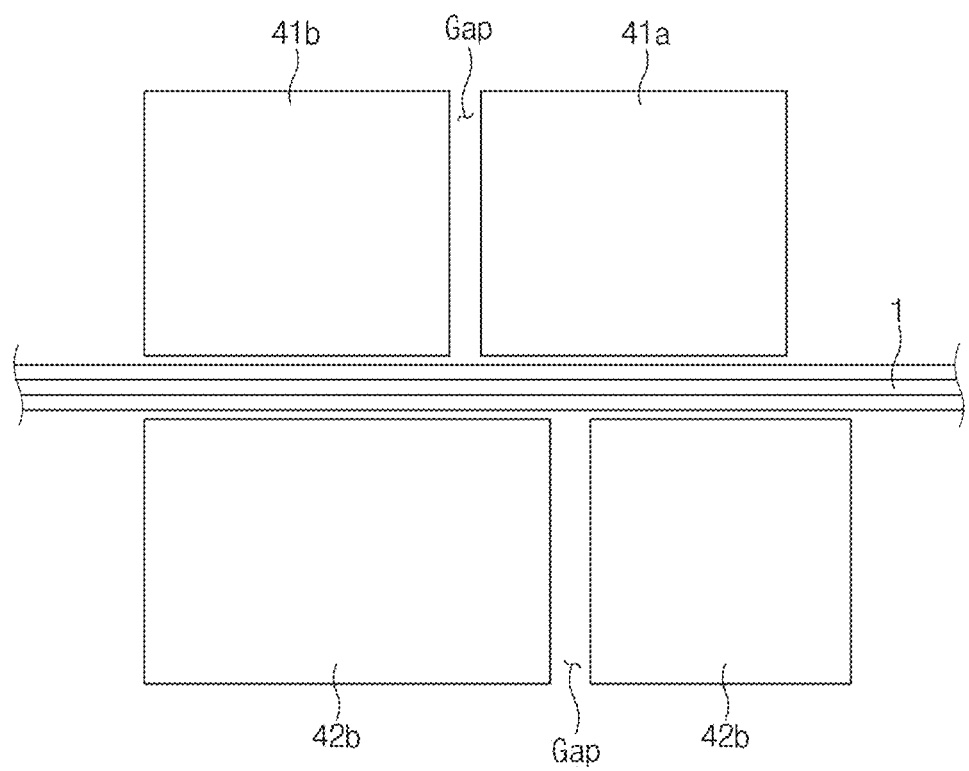
FIG. 5 is an enlarged view illustrating a state in which a gap between a main upper stripper and an auxiliary upper stripper and a gap between a main lower stripper and an auxiliary lower stripper are dislocated along a vertical direction.

Furthermore, referring to FIG. 5 that is an enlarged view illustrating a state in which the gap between the main upper stripper 41a and the auxiliary upper stripper 41b and the gap between the main lower stripper 42a and the auxiliary lower stripper 42b are dislocated along a vertical direction, the gaps occur between the main upper stripper 41a and the auxiliary upper stripper 41b and between main lower stripper 42a and the auxiliary lower stripper 42b.

Here, the gap between the main upper stripper 41a and the auxiliary upper stripper 41b and the gap between the main lower stripper 42a and the auxiliary lower stripper 42b are dislocated along the vertical direction.

That is, as a width of the electrode base material 1 increases (a distance between the non-coated portions on both ends increases), it is difficult to efficiently fix the coated portion 1b by using one fixed stripper due to an impact and thermal expansion applied during the processing.

Also, when only one main stripper 41a or 42a is provided, there is a high possibility that shaking of the coated portion 1b occurs in the vicinity of the first auxiliary mold 20 and the second auxiliary mold 30, in which the processing is performed. Therefore, the auxiliary strippers 41b and 42b may be additionally mounted to the first auxiliary mold 20 and the second auxiliary mold 30 to additionally fix the coated portion 1b when the first auxiliary upper mold 21 and the second auxiliary lower mold 32 are slid.

For the above reasons, the stripper provided in this embodiment is provided to be divided into the main strippers 41a and 42a mounted on the main mold 10 and the auxiliary strippers 41b and 42b mounted on the auxiliary molds 20 and 30.

Furthermore, as described above, in this embodiment, the gap between the main upper stripper 41a and the auxiliary upper stripper 41b and the gap between the main lower stripper 42a and the auxiliary lower stripper 42b are dislocated along the vertical direction. That is, when the upper and lower gap positions are the same, both upper and lower sides may be opened to cause a possibility that the coated portion 1b is sag or be jammed between the gaps. However, when the gaps are dislocated as described above, since at least one side of both the upper and lower sides is in a blocked state, the possibility of occurrence of the sagging or jamming of the coated portion 1b between the gaps may be significantly reduced.

In the present invention having the above configuration, since the first auxiliary mold 20 and the second auxiliary mold 30 individually notch the non-coated portion 1a disposed on each of both the ends of the electrode base material 1 according to an operation of the main mold 10, the molding of both the non-coated portions 1a may be more easily performed, and larger and various types of electrode base material may be notched.

Since the first and second auxiliary molds 20 and 30 individually and simultaneously notch the non-coated portions, respectively, the design flexibility of processing each of the electrode tabs at both the sides may increase, and the processing position and precision may be adjusted more easily.

In the notching mold according to the present invention, since the stripper 40 is provided, the movement of the coated portion may be fixed when the notching is performed.

Since the stripper is divided into the main stripper (the main upper stripper and the main lower stripper) and the auxiliary stripper (the auxiliary upper stripper and the auxiliary lower stripper), the coated portion may be more stably supported by replacing only the auxiliary stripper according to the thermal expansion coefficient of the electrode base material due to the temperature.

Furthermore, the gap between the main upper stripper 41a and the auxiliary upper stripper 41b and the gap between the main lower stripper 42a and the auxiliary lower stripper 42b may be dislocated along the vertical direction to prevent pressing, the marks, or the jamming from occurring on the electrode base material. The auxiliary strippers 41b and 42b may be detachably mounted on the first auxiliary mold 20 and the second auxiliary mold 30, and thus, the first auxiliary mold 20 and the second auxiliary mold 30 may be exchanged together with the replacement when the first auxiliary mold 20 and the second auxiliary mold 30 are replaced.

While the embodiments of the present invention have been described with reference to the specific embodiments, it will be apparent to those skilled in the art that various changes and modifications may be made without departing from the spirit and scope of the invention as defined in the following claims.

DESCRIPTION OF THE SYMBOLS

1: Electrode base material
1a: Non-coated portion
1b: Coated portion
2a: Electrode tab
10: Main mold
11: Upper mold
12: Lower mold
20: First auxiliary mold
30: Second auxiliary mold
40: Stripper

The invention claimed is:

1. A notching mold, configured to mold a non-coated portion when an electrode base material, in which an active material is applied to a surface of a collector, is input, wherein the non-coated portion, on which the active material is not applied, is formed on each of a first end and a second end of a coated portion, on which the active material is applied, the notching mold comprising:
  a main mold comprising an upper mold and a lower mold, which are parallel to each other, wherein the upper mold and the lower mold are slidable close to or away from each other;
  a first auxiliary mold mounted at a first side of the main mold and configured so that, when the electrode base material is input into the main mold, the non-coated portion on the first end of the electrode base material is disposed at a processible position, the first auxiliary mold comprising a first auxiliary upper mold coupled to the upper mold and a first auxiliary lower mold coupled to the lower mold; and
  a second auxiliary mold mounted at a second side of the main mold and configured so that, when the electrode base material is input into the main mold, the non-coated portion on the second end of the electrode base material is disposed at a processible position, the second auxiliary mold comprising a second auxiliary upper mold coupled to the upper mold and a second auxiliary lower mold coupled to the lower mold.

2. The notching mold of claim 1, wherein, when the upper mold and the lower mold of the main mold are slid, the sliding of the first auxiliary upper mold and the first auxiliary lower mold of the first auxiliary mold and the sliding of the second auxiliary upper mold and the second auxiliary lower mold of the second auxiliary mold are performed at the same time to individually and respectively notch the non-coated portions of the electrode base material disposed at the processible positions, respectively.

3. The notching mold of claim 1, wherein the first auxiliary upper mold and the second auxiliary upper mold are coupled to be detachable and adjustable in position in the upper mold, and the first auxiliary lower mold and the second auxiliary lower mold are coupled to be detachable and adjustable in position in the lower mold.

4. The notching mold of claim 1, wherein, the first auxiliary mold and the second auxiliary mold are configured to notch a plurality of electrode tabs in one stroke, when the electrode base material is input into the main mold.

5. The notching mold of claim 1, further comprising a stripper configured to press and fix the coated portion when the electrode base material is input is disposed between the first auxiliary mold and the second auxiliary mold.

6. The notching mold of claim 5, wherein the stripper comprises an upper stripper coupled to the upper mold and a lower stripper coupled to the lower mold,
wherein, when the non-coated portions are molded using the first auxiliary mold and the second auxiliary mold, a predetermined pressure is applied to the coated portion between the upper stripper and the lower stripper to fix movement of the coated portion.

7. The notching mold of claim 6, wherein the upper stripper comprises a main upper stripper disposed at a center between the first auxiliary upper mold and the second auxiliary upper mold and an auxiliary upper stripper disposed at one side of the main upper stripper with a gap therebetween, and
the lower stripper comprises a main lower stripper disposed at a center between the first auxiliary lower mold and the second auxiliary lower mold and an auxiliary lower stripper disposed at one side of the main lower stripper with a gap therebetween.

8. The notching mold of claim 7, wherein the auxiliary upper stripper is disposed at each of the first and second sides of the main upper stripper with a gap therebetween, and
the auxiliary lower stripper is disposed at each of the first and second sides of the main lower stripper with a gap therebetween.

9. The notching mold of claim 7, wherein each of the auxiliary upper stripper and the auxiliary lower stripper is detachable.

10. The notching mold of claim 7, wherein the auxiliary upper stripper is detachably coupled to the first auxiliary upper mold of the first auxiliary mold or the second auxiliary upper mold of the second auxiliary mold, and
the auxiliary lower stripper is detachably coupled to the first auxiliary lower mold of the first auxiliary mold or the second auxiliary lower mold of the second auxiliary mold.

11. The notching mold of claim 7, wherein the gap between the main upper stripper and the auxiliary upper stripper and the gap between the main lower stripper and the auxiliary lower stripper are dislocated along a vertical direction.

* * * * *